Figure 1:
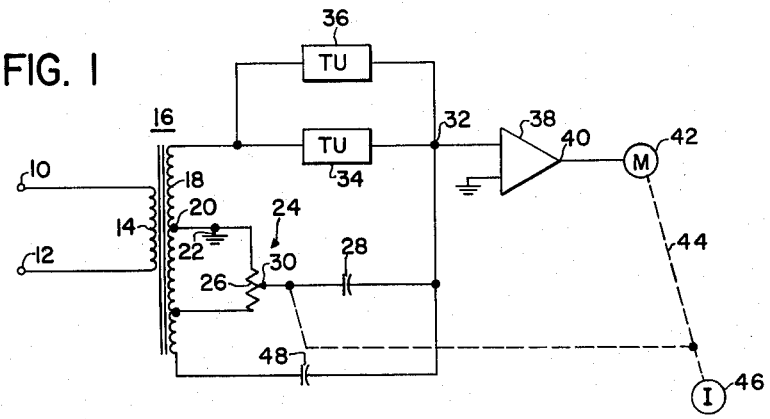

July 5, 1966   H. M. HERMANSON   3,258,967
FUEL GAUGE CIRCUITRY FOR DROP TANKS
Filed Dec. 9, 1963

INVENTOR.
HARRY M. HERMANSON
BY
*Bruce C Lutz*
ATTORNEY

10 # United States Patent Office 3,258,967
Patented July 5, 1966

3,258,967
FUEL GAUGE CIRCUITRY FOR DROP TANKS
Harry M. Hermanson, Minneapolis, Minn., assignor to Honeywell Inc., a corporation of Delaware
Filed Dec. 9, 1963, Ser. No. 328,993
7 Claims. (Cl. 73—304)

This invention is related generally to fuel gauge circuitry and more specifically to fuel gauge circuitry incorporating drop tanks for containing part of the fuel to be initially gauged.

When a fuel quantity indicating system is used to indicate simultaneously fuel from a plurality of tanks, some of which are drop tanks, a problem arises in providing a correct indication when one of the drop tanks is released. This problem arises due to the fact that there is a reference capacitor for supplying a signal equal in magnitude to the signal due to the total empty capacitance of all the tank units including the tank unit in the drop tank. This reference capacitor is normally incorporated in the main circuitry and is not dropped along with the drop tank. For this reason there is a reference signal being applied to the gauging circuitry with no counteracting signal to cancel it out.

In the past this problem has been solved by connecting a relay so that its operating winding is connected through a drop tank connector to ground. When the drop tank is released the connection is broken and the relay is deenergized. In the deenergized position the relay is connected to insert a substitute capaictor in the bridge circuit to replace the capacitance which had been supplied by the drop tank capacitive unit in the empty condition. Present day reliability standards are such that a premium is placed upon the elimination of each mechanically moving part. A relay is one such moving part that can be eliminated by the present invention.

Basically the present invention involves placing two capacitors in series across the tank unit leads but in a poistion such that they stay with the airplane instead of being dropped along with the tank unit. A junction point between these two substitute capacitors is then connected to ground through the drop tank connector. As long as the drop tank connector is in position, the two substitute capacitors are grounded and have no capacitive effect on the system. Upon elimination of the ground connection the two substitute capacitors act as a single capacitive unit which has a capacitance equal to one half the combined total of the two capactive units if they are originally of equal capactive values. With this knowledge in mind, two capacitors each of which is twice the capacitive value of the empty tank capacitance of the drop tank unit can be placed in series to provide the signal which is necessary to counteract the reference capactive signal and therefore eliminate errors in the fuel gauging circuitry. It should be realized however, that it is merely necessary to have a total substitute capacitance equal to the tank unit and that to accomplish this result, unequal capacitors may be used where this combination is desirable.

It is an object of this invention to simplify the circuitry in a fuel gauging unit.

Figure 2:
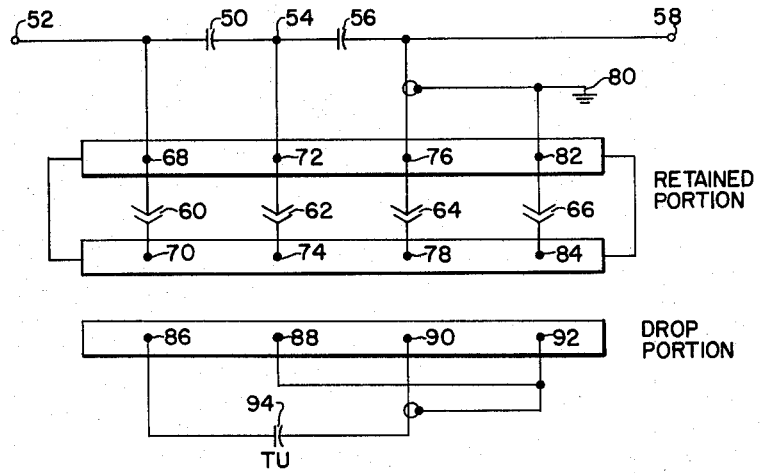

Further objects and advantages of this invention will be apparent from a reading of the specification and appended claims in conjunction with the drawings in which:

FIGURE 1 is a combination circuit in semi-block diagram form of a typical fuel gauging unit utilizing a plurality of tank units; and FIGURE 2 is a schematic of the detailed circuitry utilized in providing the substitute capacitance automatically upon release of a drop tank unit and its associated tank unit capacitor.

In FIGURE 1 terminals 10 and 12 are connected to two ends of a primary winding 14 on a transformer generally designated as 16 and having a secondary winding 18. A tap 20 or winding 18 is connected to ground 22. A potentiometer generally designated as 24 has a resistance element 26 connected between ground 22 and another tap near one end of winding 18. A rebalance capacitor or impedance means 28 is connected between a wiper 30 of potentiometer 24 and a summing point means or junction point 32. A tank unit means, condition sensitive means or condition sensing means 34 is connected between the other end of winding 18 and the junction point 32. Another tank unit means or condition sensing means 36 is connected in parallel with the tank unit 34. The junction point 32 is connected to an input of an amplifier 38 which has an output 40 connected to drive a motor means 42. The motor 42 also receives a reference signal although this connection is not shown. A mechanical connection 44 attaches the motor 42 to an indicator 46 and also the wiper 30 of potentiometer 24. An indication is obtained upon indicator 46 in accordance with the position of motor 42 and the wiper 30 is also moved on resistance element 26 in accordance with the position of the output of motor 42. A reference capacitor 48 is connected between junction point 32 and the end of winding 18 to which resistance winding 26 is connected.

In FIGURE 2 a capacitance means, substitute tank unit means or substitute impedance means 50 is connected between an input 52 and a junction point 54. A second capacitance means, substitute tank unit means or substitute impedance means 56 is connected between the junction point 54 and an output terminal 58. A connector is shown in FIGURE 2 having two portions labeled Retained Portion and Drop Portion. The retained portion of the connector has a spring action whereby contacts generally designated as 60, 62, 64, and 66 are connected upon application of the dropped portion to the retained portion. When the drop portion of the connector is disengaged, the contacts 60 to 66 are disengaged also. The input terminal 52 is connected to a lead or pin 68 of contacts 60. A further lead or pin 70 is connected to the other side of contact 60. The junction point 54 is connected to a lead or pin 72 of the pair of contacts 62. The other contact of the pair of contacts 62 is connected to a pin or lead 74. The output terminal 58 is connected to a lead or pin 76 of the set of contacts 64 while the other contact of the set of contacts 64 is connected to a pin or lead 78. A reference potential 80 is connected to a shield on the leads going to output terminal 58 and is also connected to one of the contacts 66 by a lead or pin 82. The other contact of the set of contacts 66 is connected to lead or pin 84. The drop portion of the connector has leads or pins 86, 88, 90 and 92 which are connected respectively to pins 70, 74, 78, and 84 in the retained portion of the connector. A tank unit 94 is connected between the pins 86 and 90 while pins 88 and 92 are connected together and also connected to a shield on the lead of the tank unit which is connected to terminal 90.

The fuel gauging circuit shown in FIGURE 1 is a simplified version of a bridge circuit and associated rebalance means which is used in the industry to measure fluid levels and quantities. The current flow through capacitor 48 is such that it will equal the current flow through all of the tank units being gauged, and which are represented by tank units 34 and 36, when these tank units are in an empty condition. The current flow through capacitor 28 is then varied to counteract any signal through the tank units due to the fluid level between the electrodes of the tank units. In other words, the fluid rising between the electrodes of the tank units will increase the capacitance thereof and thereby increase the current flow. This increased flow will provide a signal to amplifier 38 which will drive motor 42 and thereby move the position of wiper 30 on potentiometer 24. This will increase the current flow through capacitor 28 and provide null or balanced conditions again. A further explanation of this general type of fuel gauging system can be obtained from reading the Franzel et al. Patent 3,037,385 issued June 5, 1962 and assigned to the same assignee as the present invention.

If one of the tank units of FIGURE 1 is removed from the circuit, it can be determined that without adjusting the value of capacitor 48 or adjusting the voltage applied thereto, there will be an error in the circuit since there will be an excessive current flow through capacitor 48 as compared to the current flow through the remaining tank units. This will result in a fuel quantity indication of a value which is less than the actual fuel quantity. The purpose of this invention is, as previously mentioned, to provide a correction for this condition without using moving parts. As is previously mentioned, one method of compensating for the loss of the tank unit capacitor is to insert a substitute capacitor across the same leads which previously had been connected to the tank unit. The value of this substitute capacitor must be of course equal to the empty tank capacitance of the tank unit to thereby cancel out only the current from the reference capacitor which is attributable to the tank unit which had been dropped.

As has been briefly described before, the circuit of FIGURE 2 provides a means for placing the substitute capacitor in circuit automatically upon release of the tank unit capacitor in the drop tank. The entire circuitry of FIGURE 2 is intended to replaced the block labeled 34 or 36 in FIGURE 1 with input 52 being connected to winding 18 and terminal 58 to summing point 32. The two portions of the connector which are labeled retained portion and drop portion are a part of an integral spring loaded connector such that the contacts 60, 62, 64 and 66 make actual electrical contact only when the drop portion is engaged with the rest of the connector. As may be determined, when the two portions are engaged there is an electrical circuit from input lead 52 through contact 60, tank unit 94, contact 64, to output terminal 58. Since there is a ground connection from ground 80 through contact 66, contact 62, to junction point 54, both the capacitors 50 and 56 are grounded at one electrode and therefore are of no capacitive effect between input 52 and 58. Although it is stated that these capacitors have no actual capacitive effect between these two points, there is some effect on loading of the circuit. However, as long as these capacitors have a large impedance compared to the impedance of the supply, the effect is negligible. It may be assumed that each of the capacitors 50 and 56 are of a capacitive value twice that of the empty tank capacitive value of tank unit 94. As will be realized, when two capacitors of an equal value are placed in series, the resultant capacitance of the combination is one-half the capacitance of the individual capacitors. When the drop portion of the connecter is disengaged or released, the retained portion springs apart opening each of the contacts 60 to 66. In this condition, the tank unit 94 is no longer connected between terminals 52 and 58 but the two capacitors 50 and 56 are no longer grounded and therefore do affect the circuit. Since as previously mentioned, the two capacitive units 50 and 56 are assumed to be originally twice the value of the empty tank capacitance of capacitor 94, the total effect of these two substitute capacitors is to place a capacitance between terminals 52 and 58 which is equal to the empty tank capacitance of the tank unit 94 to thereby allow current flow therethrough which will counteract the current flow through capacitor 48 of FIGURE 1 and thereby provide a correct reading on indicator 46. As previously mentioned the two capacitors 50 and 56 may have different capacitive values as long as the total series capacitance equals the capacitance of tank unit 94.

While reference has been made in the specification to specific capacitors and although a specific type of connector is described along with a specific type of fuel gauge circuit, it is to be realized that all equivalents within the scope of the claims are intended to be included and that the invention is not limited to the apparatus as described. The connector which was described is not a necessary part of the invention as any drop tank connector will work. However, this tank unit connector was described since this type of connector provides the greatest protection against shorts between various exposed terminals on the surface of an airplane due to water condensation etc. Also, while fuel gauging has been mentioned specifically it is to be realized that this same approach may be used in other condition sensing apparatus to obtain the same result.

I therefore wish to be limited not by the description but by the scope of the appended claims.

1. Fuel gaging apparatus comprising, in combination:
transformer means for supplying power;
reference potential means connected to a tap of said transformer means;
rebalance potentiometer means connected between said reference potential means and one end of said transformer means, said potentiometer means including wiper means;
rebalance capacitor means having one electrode connected to said wiper means of said potentiometer means to receive a first signal of a first phase with respect to said reference potential means;
summing point means connected to the other electrode of said rebalance capacitor means;
substitute capacitance means connected between said transformer means and said summing point, said substitute capacitance means receiving a second signal of a phase opposite said first phase, said substitute capacitance means comprising two capacitors including an intermediate junction means situated between said two capacitors;
connector means comprising first and second portions, each of said portions including first, second, third and fourth contacts which mate with the corresponding contacts in the other portion, the second portion of said connector means being a part of a drop tank unit;
first means connecting said first contact of said first portion of said connector means to one end of said substitute capacitance means;
second means connecting second contact of said first portion of said connector means to the other end of said substitute capacitance means;
third means connecting said third contact of said first portion of said connector means to said intermediate junction means of said substitute capacitance means;
fourth means connecting said fourth contact of said first portion of said connector means to said reference potential means;
tank unit capacitor means situated in said drop tank unit and connected between said first and second contacts of said second portion of said connector means, said tank unit capacitor means having an empty tank capacitance equal to the capacitance of said substitute capacitance means when said first and second portions of said connector means are unattached electrically;
means connecting said third and fourth contacts of said second portion of said connector means together;
amplifying means connected between summing means and said wiper means for adjusting said wiper means to minimize any input signals to said amplifying means; and
indicator means attached to said amplifying means for providing an output indicative of the amount of fuel in said drop tank unit.

2. Fuel gaging apparatus comprising, in combination:
first means for supplying a first signal of a first phase;
reference potential means;
variable potential means for supplying a second signal of a phase opposite said first phase;
summing point means;

rebalance capacitor means connected between said variable potential means and said summing point means;
substitute capacitance means connected between said first means and said summing point means, said substitute capacitance means receiving said first signal from said first means, and said substitute capacitance means comprising two capacitors including an intermediate junction means situated between said two capacitors;
connector means comprising first and second portions, each of said portions including first, second, third, and fourth contacts which mate with the corresponding contacts on the other portion, the second portion of said connector means being a part of a drop tank unit;
first means connecting said first contact of said first portion of said connector means to one end of said substitute capacitance means;
second means connecting said second contact of said first portion of said connector means to the other end of said substitute capacitance means;
third means connecting said third contact of said first portion of said connector means to said intermediate junction means of said substitute capacitance means;
fourth means connecting said fourth contact of said first portion of said connector means to said reference potential means;
tank unit capacitor means situated in said drop tank unit and connected between said first and second contacts of said second portion of said connector means, said tank unit capacitor means having an empty tank capacitance equal to the capacitance of said substitute capacitance means when said first and second portion of said connector means are unconnected;
means connecting said third and fourth contacts of said second portion of said connector means together;
amplifying means connected between said summing means and said variable potential means for adjusting said variable potential means to minimize any input signals to said amplifying means; and
indicator means attached to said amplifying means for providing an output indicative of the amount of fuel in said drop tank unit.

3. Fuel gaging apparatus comprising, in combination:
first means for supplying a first signal of a first phase;
reference potential means;
variable potential means for supplying a second signal of a phase opposite said first phase;
summing point means;
first impedance means connected between said variable potential means and said summing point means;
substitute impedance means connected between said first means and said summing point means, said substitute impedance receiving said first signal from said first means;
connector means comprising first and second portions, each of said portions including first, second, third and fourth contacts which mate with the corresponding contacts on the other portion, the second portion of said connector means being a part of a drop tank unit;
first means connecting said first contact of said first portion of said connector means to one end of said substitute impedance means;
third means for rendering said substitute impedance ineffective uopn connection to said reference potential connecting said third contact of said first portion of said connector means to said substitute impedance means;
fourth means connecting said fourth contact of said first portion of said connector means to said reference potential means;
condition sensitive means situated in said drop tank unit and connected between said first and second contacts of said second portion of said connector means;
means connecting said third and fourth contacts of said second portion of said connector means together;
amplifying means connected between said summing means and said variable potential means for adjusting said variable potential means to minimize any input signals to said amplifying means; and
indicator means attached to said amplifying means for providing an output indicative of a condition in said drop tank unit.

4. Condition sensing apparatus comprising, in combination:
first means for supplying a first signal of a first phase;
second means for supplying a second signal of a phase opposite said first phase;
summing point means;
first impedance means connected between said second means and said summing point means;
substitute impedance means connected between said first means and said summing point means, said substitute impedance receiving said first signal from said first means;
connector means comprising first and second portions, each of said portions including first, second, third and fourth contacts which mate corresponding contacts on the other portion, the second portion of said connector means being a part of a detachable unit;
third means connecting said first contact of said first portion of said connector means to one end of said substitute impedance means;
fourth means for rendering said substitute impedance ineffective upon a connection to a reference means, said fourth means connecting third contact of said portion of said connector means to said substitute impedance means;
fourth means connecting said fourth contact of said first portion of said connector means to said reference means;
condition sensitive means situated in said detachable unit and connected between said first and second contacts of said portion of said connector means;
means connecting said third and fourth contacts of said second portion of said connector means together; and
amplifying means connected between said summing means and said second means for adjusting said amplifying means.

5. Apparatus for use with a detachable condition sensing unit comprising, in combination:
transformer means for supplying power;
reference potential means;
substitute capacitance means connected between said transformer means and a first terminal means, said substitute capacitance means comprising two capacitors including an intermediate junction means situated between said two capacitors;
connector means comprising first and second portions, each of said portions including first, second, third and fourth contacts which mate with the corresponding contacts on the other portion, the second portion of said connector means being a part of the detachable condition sensing unit;
first means connecting said first contact of said first portion of said connector means to one end of said substitute capacitance means;
second means connecting said second contact of said first portion of said connector means to the other end of said substitute capacitance means;
third means connecting said third contact of said first portion of said connector means to said intermediate junction means of said substitute capacitance means;
fourth means connecting said fourth contact of said first portion of said connector means to said reference potential means;

tank unit capacitor means situated in said detachable unit and connected between said first and second contacts of said second portion of said connector means, said tank unit capacitor means having an empty tank capacitance equal to the capacitance of said substitute capacitance means when said first and second portions of said connector means are unattached electrically and mechanically; and fifth means connecting said third and fourth contacts of said second portion of said connector means together.

6. Apparatus for us with a detachable condition sensing unit comprising, in combination:

first and second terminal means;

substitute capacitance means connected between said first and second terminal means, said substitute capacitance means comprising two capacitors including an intermediate junction means situated between said two capacitors;

connector means comprising first and second portions, each of said portions including first, second, third and fourth contacts which mate with the corresponding contacts on the other portion, the second portion of said connector means being a part of the detachable condition sensing unit;

first means connecting said first contact of said first portion of said connector means to one end of said substitute capacitance means;

second means connecting said second contact of said first portion of said connector means to the other end of said substitute capacitance means;

third means connecting said third contact of said first portion of said connector means to said intermediate junction means of said substitute capacitance means;

fourth means connecting said fourth contact of said first portion of said connector means to said reference potential means;

condition sensing capacitor means connected between said first and second contacts of said second portion of said connector means;

fifth means connecting said third and fourth contacts of said second portion of said connector means together.

7. Apparatus for use with a detachable condition sensing unit comprising, in combination:

input and output means;

substitute impedance means connected between said input and output means;

connector means comprising first and second portions, each of said portions including first, second, third and fourth contacts which mate with the corresponding contacts on the other portion, the second portion of said connector means being a part of the detachable condition sensing unit;

first means connecting said first contact of said first portion of said connector means to said input means;

second means connecting said second contact of said first portion of said connector means to said output means;

third means for rendering said substitute impedance means ineffective upon connection to a reference means, said third means connecting said third contact of said first portion of said connector means to said substitute impedance means;

fourth means connecting said fourth contact of said first portion of said connector means to the reference means;

condition sensing unit means connected between said first and second contacts of said second portion of said connector means;

fifth means connecting third and fourth contacts of said second portion of said connector means together.

References Cited by the Examiner

UNITED STATES PATENTS 2,535,094  12/1950  Samiran _____ 340—244
2,984,439  5/1961   Fletcher _____ 244—135 X LOUIS R. PRINCE, *Primary Examiner.*